United States Patent [19]

Oono

[11] Patent Number: 4,831,556
[45] Date of Patent: May 16, 1989

[54] DEVICE CAPABLE OF DISPLAYING WINDOW SIZE AND POSITION

[75] Inventor: Yasukazu Oono, Tokyo, Japan
[73] Assignee: Kabushiki Kaisha Toshiba, Kawasaki, Japan
[21] Appl. No.: 73,743
[22] Filed: Jul. 15, 1987
[30] Foreign Application Priority Data Jul. 17, 1986 [JP] Japan ............................ 61-166752

[51] Int. Cl.$^4$ ............................................ G06F 15/62
[52] U.S. Cl. ................................. 364/521; 340/721; 340/723
[58] Field of Search ............... 364/518, 521; 340/721, 340/723, 724, 799, 747, 712

[56] References Cited

U.S. PATENT DOCUMENTS 4,437,093 3/1984 Bradley .............................. 340/726
4,694,288 9/1987 Harada .............................. 340/721

OTHER PUBLICATIONS

"Macintosh", 1983, pp. 26 and 58, Apple Computer, Inc.

Primary Examiner—Gary V. Harkcom
Assistant Examiner—Randy W. Lacasse
Attorney, Agent, or Firm—Cushman, Darby & Cushman

[57] ABSTRACT

A document-processing device has a multi-window display function. This device displays an indicia which enables an operator to quickly and easily visually ascertain the positional and size relationship between a window and a window-movable region on an image screen where the window can move or change its size. The indicia includes a first display region, a first display pattern, a second display region, and a second display pattern. The first display pattern is displayed in the first display region. The second display pattern is displayed in the second display region. A ratio of the length of the first display pattern to that of the first display region is equal to the ratio of the length of the window to the length of the window-movable region. The ratio of a length of the second display pattern to that of the second display region is equal to a ratio of the width of the window to the width of the window-movable region. A position of the first pattern displayed in the first display region corresponds to a position of the window set on the window-movable region, with respect to a horizontal direction. A position of the second pattern displayed in the second display region corresponds to a position of the window set on the window-movable region with respect to a vertical direction.

17 Claims, 8 Drawing Sheets

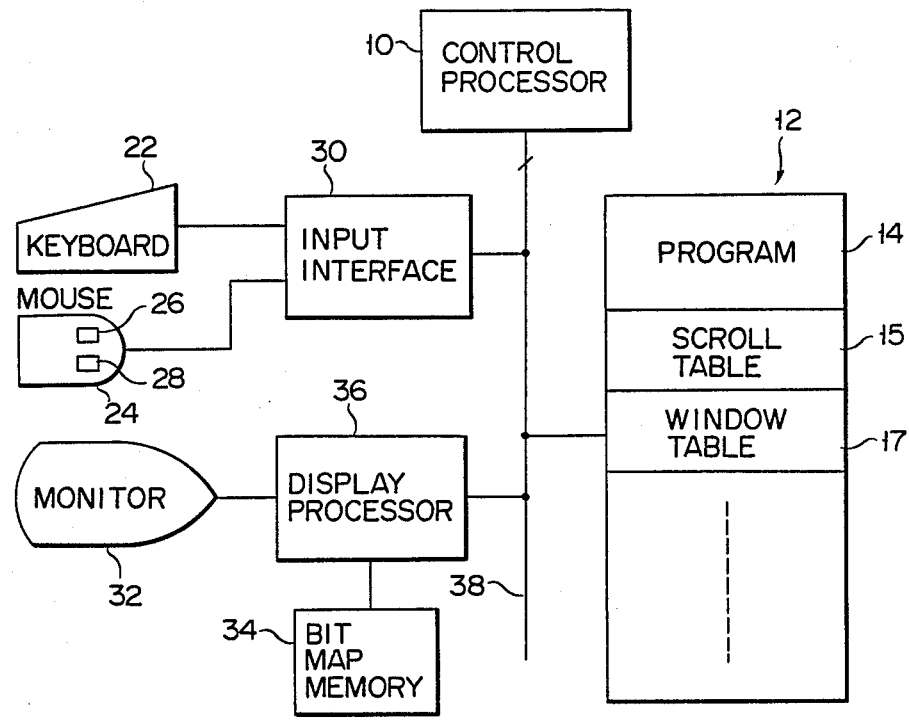
F I G. 1
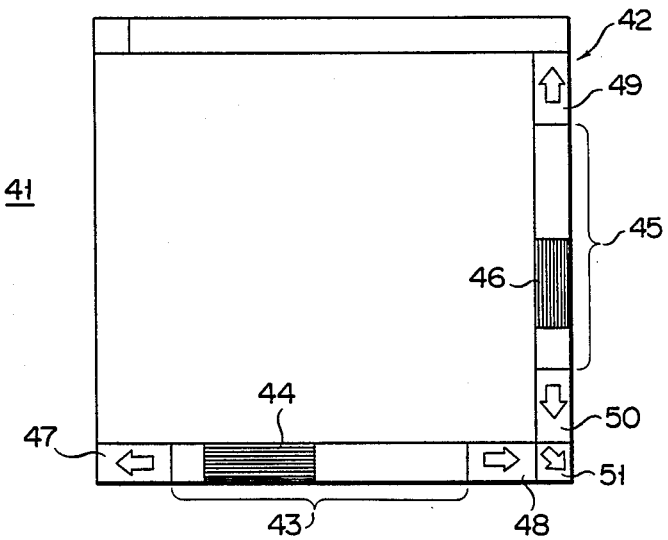
F I G. 2

| | HORIZONTAL INDICIA | | | VERTICAL INDICIA | | |
|---|---|---|---|---|---|---|
| 0 | px | ax | lx | py | ay | ly |
| 1 | | | | | | |
| 2 | | | | | | |
| n-1 | | | | | | |

F I G. 4

| 0 | Ox | Oy | Ax | Ay | Lx | Ly |
|---|---|---|---|---|---|---|
| 1 | | | | | | |
| 2 | | | | | | |
| n-1 | | | | | | |

F I G. 5

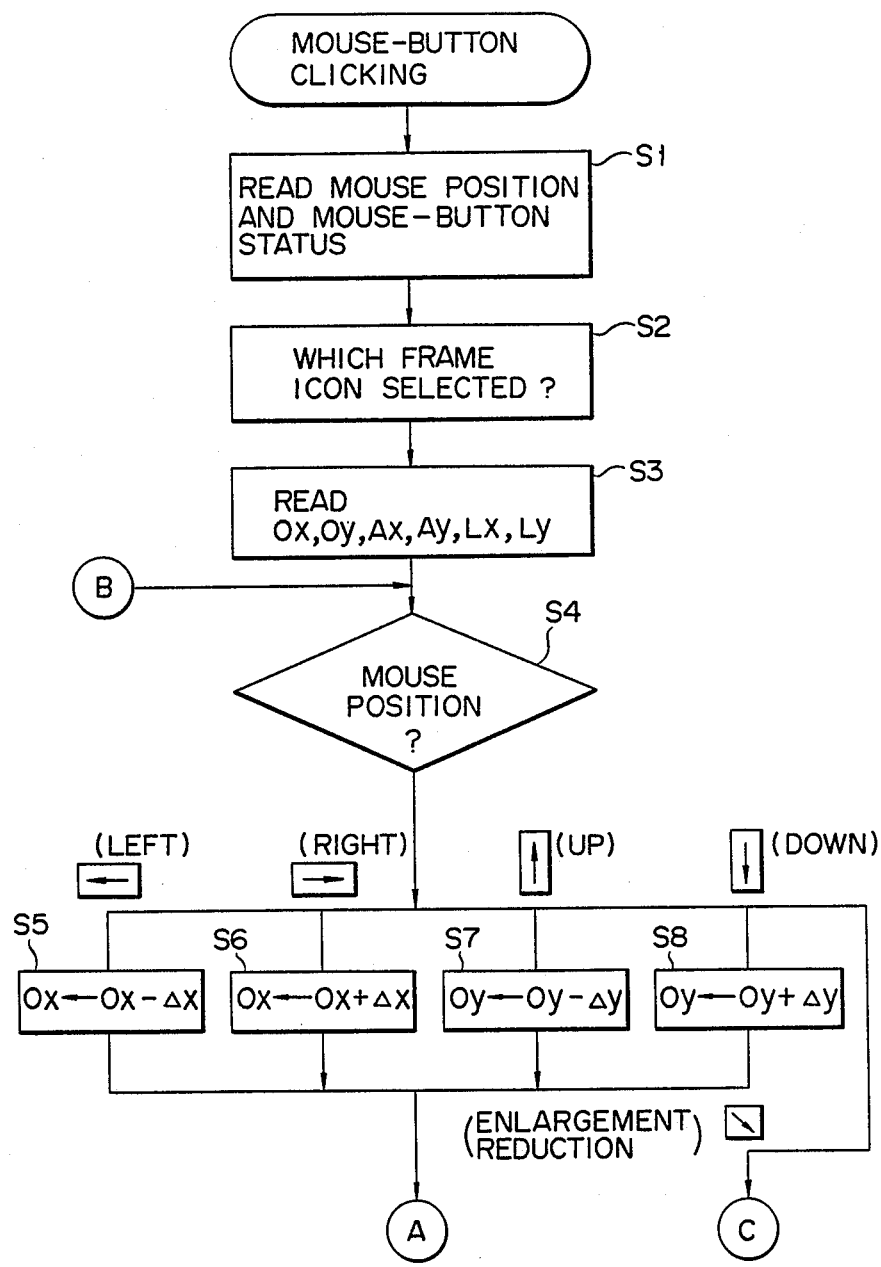
F I G. 6A

DEVICE CAPABLE OF DISPLAYING WINDOW SIZE AND POSITION

BACKGROUND OF THE INVENTION

This invention relates to the improvement of a device which can display, through a window, part of an image screen onto a visual screen.

A document processing device currently exists, which is capable of executing the creation/editing of a document, while simultaneously displaying the contents of the document. One of the display functions possessed by such a document processing device is a multi-window display function, which simultaneously displays separate information on a single visual screen, through different windows. This multi-window display function is used as a means to improve a man-machine interface.

There is a document-processing device with a multi-window display function which displays a scale corresponding to the size of an image screen an marks the center or the start point of a window on the scale with a symbol. With this display function, however, an operator cannot easily ascertain the size of a window at a glance, in relation to the region within which the window can move, i.e., the region on the image screen in which the window can move and/or change its size.

This problem also occurs in a document-processing device which does not have a multi-window display function.

To set a plurality of windows on the image screen, it may be necessary to restrict the movable range of each window. However, the prior art does not offer a function for enabling the operator to properly ascertain the limit of the movable range.

SUMMARY OF THE INVENTION

Accordingly, it is an object of this invention to provide a device having a display function which enables an operator to quickly and easily visually ascertain the position and the size of a window with respect to the region in which the window can move, and a method for effecting such a display function.

To achieve this object, the device of this invention comprises:

display means (32) having a visual screen for displaying image data;

window display means (10, 36, 17, etc.) for controlling the display means (32) such that portion of an image screen is displayed on the visual screen, through a window set on the image screen; and indicia display means (10, 15, 17, 34, 36) for controlling the display means so as to display an indicia on the visual screen, the indicia indicating a positional and size relationship between the window and a window-movable region on the image screen, in which the window can move and/or change its size.

With the above arrangement, the device of this invention offers ease of operation such that an operator can recognize at a glance where and how large a window (61) is in the window-movable region (82), by referring to indicias (43-48). Accordingly, the operator can quickly determine how much space remains for the window to move around in or can increase its size in the movable region.

BRIEF DESCRIPTION OF THE DRAWINGS

FIG. 1 is a block diagram of a document-processing device according to an embodiment of this invention;

FIG. 2 is a diagram showing a window display region to be displayed on a monitor shown in FIG. 1;

FIG. 4 is a diagram illustrating the structure of a scroll table;

FIG. 5 is a diagram used to explain a window table;

FIGS. 6A to 6C are flowcharts for explaining the operation of the document-processing device shown in FIG. 1;

DETAILED DESCRIPTION OF THE PREFERRED EMBODIMENTS

Figure 3:
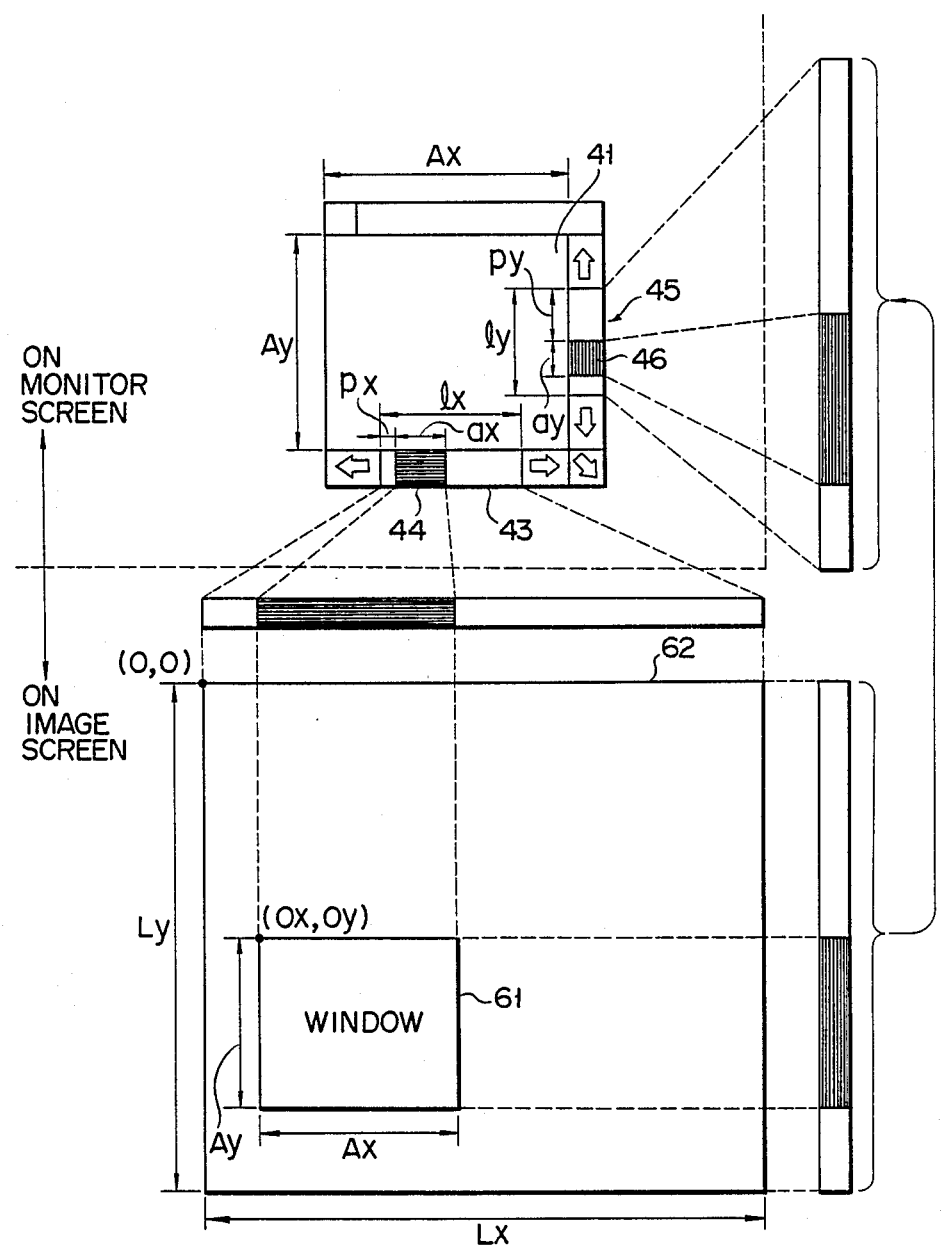
FIG. 3 is a diagram used to explain the relationship between the window display region and a window-movable region and a window on an image screen.

A document processing device according to an embodiment of this invention will now be explained in detail, in conjunction with the accompanying drawings.

FIG. 1 is a block diagram showing the arrangement of the document-processing device which has a multi-window display function. The arrangement of this document-processing device will be explained with reference to FIG. 1. This document-processing device has a control processor 10 for controlling the overall device. Control processor 10 is coupled to an internal bus 38, which is coupled to a memory 12. Memory 12 includes a program section 14 for storing a program according to which control processor 10 operates a scroll table 15, and a window table 17.

An input interface 30 is coupled to internal bus 38 and also to a keyboard 22 and a pointing device 24. Keyboard 22 may be an ordinary keyboard, and pointing device 24 may be a mouse having a left button 26 and a right button 28. Input interface 30 controls inputs from keyboard 22 and mouse 24, and outputs the input data onto bus 38. The document-processing device further has a monitor 32 such as a CRT display, and a bit map memory 34 which stores a bit image of screen data to be displayed on monitor 32. A display processor 36 is coupled to monitor 32, bit map memory 34, and internal bus 38, and updates and displays the contents of bit map memory 34 on monitor 32.

A description of how a window is displayed on monitor 32 will now be made, with reference to FIG. 2. In this embodiment, a plurality of windows are set on an image screen, and the size of each window can be changed as desired. Here, the shape of the window is a rectangle. FIG. 2 shows an example of a window displayed on the visual screen of monitor 32. A window unit 41, shown in FIG. 2, is called a window display region. Icons are arranged in a ⌐ -shaped frame section 42 of window display region 41, excluding the left side thereof. Hereafter, the ⌐-shaped frame region 42 containing the icons is called a frame icon. A portion of an image screen is displayed on the rectangular region surrounded by frame icon 42 through the aforementioned window. A horizontal scroll indicia display region 43 is provided in a middle portion of the lower section of frame icon 42, and a vertical scroll indicia display region 45 is provided in a middle portion of the right section of frame icon 42. A horizontal scroll indicia 44 is displayed in display region 43, and a vertical scroll indicia 46 is displayed in display region 45. A left arrow icon 47 and a right arrow icon 48 are respectively provided on the left and right sides of horizontal indicia display region 43. Left arrow icon 47 is used to move the window on the image screen in the left direction or to scroll the screen in the right direction, while right arrow icon 48 is for moving the window in the right direction or to scroll the screen in the left direction. An up arrow icon 49 and a down arrow icon 50 are respectively provided on the upper and lower sections of vertical scroll indicia display region 45. Up arrow icon 49 is used to move the window on the image screen in the upward direction or to scroll the screen in the downward direction, while down arrow icon 50 is for moving the window in the downward direction or to scroll the screen in the upward direction. A slanted arrow icon, or a size arrow icon, 51 is provided on the lower right corner of frame icon 42, and is used to expand or contract window display region 41. Frame icon 42 expands or contracts with expansion or contraction of window display region 41 and is always positioned on the peripheral portion of window display region 41. As the size of window display region 41 changes, scroll indicia display regions 43 and 45 change their sizes without changing the sizes of icons 47–51.

A detailed description of horizontal scroll indicia display region 43, horizontal scroll indicia 44, vertical scroll indicia display region 45 and vertical scroll indicia 46 will now be made, with reference to FIG. 3. FIG. 3 shows a window 61 set on an image screen, a region 62 where window 61 can expand and move around (hereinafter referred to as "window movable region"), and window display region 41, all in association with one another. For ease of understanding the relationship between display regions and scroll indicias, it is assumed that data within window 61 is displayed in the identical size on the screen of monitor 32 (the region surrounded by frame icon 42 of window display region 41). Therefore, when the X-direction size (length) and the Y-direction size of window 61 are Ax and Ay, the X-direction size and Y-direction size of window display region 41 are also Ax and Ay, respectively. For easier understanding, capital-letter reference numerals are used for the sizes associated with the image screen, while small-letter reference numerals are used for those associated with the screen on monitor 32.

The horizontal size of horizontal scroll indicia display region 43 (hereafter referred to as "horizontal scroll indicia display region size") lx is proportional to the X-direction size Lx of window movable region 62. The vertical size of vertical scroll indicia display region 45 (hereafter referred to as "vertical scroll indicia display region size") ly is proportional to the Y-direction size Ly of window movable region 62. The horizontal size of horizontal scroll indicia 44 (hereafter referred to as "horizontal scroll indicia size") ax is proportional to the X-direction size Ax of window 61, and the vertical size of vertical scroll indicia 46 (hereafter referred to as "vertical scroll indicia size") ay is proportional to the Y-direction size Ay of window 61. The ratio of size lx to size Lx is equal to the ratio of size ay to size Ay. These ratios as well as sizes lx, ly, ax and ay vary according to the expansion/contraction of window display region 41. The maximum values for X-direction and Y-direction sizes Lx and Ly of window movable region 62 are the X-direction and Y-direction sizes of the image screen, respectively, and window movable region 62 is arbitrarily set when the image screen is set.

The location of the upper left corner (window's origin) of window 61 is expressed in terms of relative coordinates (Ox, Oy) with the upper left corner of window movable region 62 being the origin (0, 0). The X-directional distance and the Y-directional distance of window's origin (Ox, Oy) from the origin (0, 0) are indicated by Ox and Oy, respectively. The distance (px) between the left end of horizontal scroll indicia 44 and the left end of horizontal scroll indicia display region 43 is proportional to relative coordinate Ox, while the distance (py) between tee upper end of vertical scroll indicia 48 and the upper end of vertical scroll indicia display region 45 is proportional to relative coordinate Oy. The ratio of distance px to relative coordinate Ox and the ratio of distance py to relative coordinate Oy are equal to the aforementioned ratio of lx to Lx and the ratio of ly to Ly. It is not necessary to set the X-directional ratios, i.e., the ratio of lx to Lx and the ratio of px to Ox, to be equal to the Y-directional ratios (the ratio of ly to Ly and the ratio of py to Oy).

Scroll table 15, which is stored in memory 12 to display scroll indicias 44 an 46 on monitor 32, will now be explained with reference to FIG. 4. Scroll table 15 has a plurality of entries in each of which data px, ax and lx associated with horizontal scroll indicia 44 and data py, ay and ly associated with vertical scroll indicia 46 are registered for each window. In FIG. 4, numbers 0 to n−1 denote the numbers of windows.

Window table 17, which is also stored in memory 12 of FIG. 1 to display the windows on monitor 32, will now be explained with reference to FIG. 5. Window table 17 also has a plurality of entries in each of which data Ox, Oy, Ax and Ay associated with window 61 and data Lx and Ly associated with window movable region 62 are registered for each window. Numbers 0 to n−1 also represent the numbers of the windows.

The operation of the document processing device with the aforementioned arrangement will now be explained with reference to FIGS. 6A–6C, 7, 8A and 8B.

Suppose that a plurality of window regions 41 (so-called multi-windows) each affixed with frame icon 42 of FIG. 2 are displayed on monitor 32. In this mode, to move or scroll a desired window 61 on an image screen or to change (either enlarge or decrease) the size of the desired window, an operator manipulates mouse 24 as follows:

(1) Manipulate mouse 24 to point a mouse cursor at a desired icon of that window display region 41 which is associated with the desired window 61. (The desired icon varies depending on an intended window operation.)

(2) Then, press, for example, left button 26 of mouse 24 to execute the intended window scrolling or move the mouse cursor while pressing left button 26 to execute the intended window resizing.

(3) Keep pressing left button 26 until window 61 moves to a desired location, or expands or contracts to a desired size.

The window scrolling or resizing by the operator will now be explained in conjunction with FIGS. 6A–6C and 7.

Pressing of left button 26 of mouse 24 (mouse button clicking) is reported to control processor 10 by input interface 30 via internal bus 38. In response to the detection of the mouse button clicking, control processor 10 starts the control sequence illustrated in the flowcharts of FIGS. 6A-6C. First, processor 10 reads the position of the mouse cursor (or mouse position) and button status from input interface 30 (step S1). The button status represents the statuses of buttons 26 and 28 of mouse 24. Based on the position of the mouse cursor, control processor determines which frame icon is selected (step S2). Control processor 10 then attains Ox, Oy, Ax, Ay Lx and Ly of that entry of window table 17 (FIG. 5) which contains information associated with window 61 corresponding to the selected frame icon 42 that has been determined in step S2 (Step S3). After step S3, control processor 10 determines at which one of the arrow icons, left arrow icon 47, right arrow icon 48, up arrow icon 49, down arrow icon 50 or slanted arrow icon 51, the mouse cursor is pointing (step S4).

The control sequence advances to step S5 when the mouse cursor is pointing at left arrow icon 47. In step S5, $\Delta x$ is subtracted from Ox obtained in step S3 and the result is re-assigned to Ox. When the mouse cursor is pointing at right arrow icon 48, the control sequence advances to step S6 where $\Delta x$ is added to Ox attained in step S3 and the result is re-assigned to Ox. When the mouse cursor is pointing at up arrow icon 49, the control sequence advances to step S7 where $\Delta y$ is subtracted from Oy attained in step S3, re-assigning the result to Oy. When the mouse cursor is pointing at down arrow icon 50, the control sequence advances to step S8 where $\Delta y$ is added to Ox attained in step S3, with the result being re-assigned to Ox. In this embodiment, since window 61 scrolls by a single "kanji" (chinese character), $\Delta x$ and $\Delta y$ correspond to the width and the height of one "kanji", respectively; however, they need not be limited to such sizes. The case in which the mouse cursor points at slanted arrow icon 51 will be described later.

Upon execution of one of steps S5-S8, the control sequence advances to step S9 where control processor 10 replaces Ox or Oy of the associated entry of window table 17 (FIG. 5) with the re-assigned Ox or Oy.

As window 61 moves, a scrolling process for rearranging (or re-displaying) horizontal scroll indicia 44 and vertical scroll indicia 46 is now carried out (step S10). This scrolling process will be explained below, referring to FIG. 7.

In the scrolling process, control processor 10 first reads lx and ly from the associated entry of scroll table 15 of FIG. 4 (step S21), and then reads Ox, Oy, Ax, Ay, Lx and Ly from the associated entry of window table 17 of FIG. 5 (step S22). Control processor 10 then calculates new px, ax, py and ay according to the following equations (step S23).

$$px = lx \, (Ox/Lx) \qquad ax = lx \, (Ax/Lx)$$
$$py = ly \, (Oy/Ly) \qquad ay = ly \, (Ay/Ly)$$

Then, control processor 10 replaces current px, ax, py and ay of the associated entry of scroll table 15 with the calculated ones (step S24). Control processor 10 controls display processor 36 to display horizontal scroll indicia 44 with size (length) ax in horizontal scroll indicia display region 443, with the left end (starting position) of indicia 44 being shifted by distance px from the left end of display region 43, and to display vertical scroll indicia 46 with size ay in vertical scroll indicia display region 45, with the upper end (starting position) of indicia 46 being shifted by distance py from the upper end of display region 45 (step 225), thus completing the scrolling process. Accordingly, indicias 44 and 46 represent the relationship between the moved window 61 and window movable region 62.

Figure 6B:
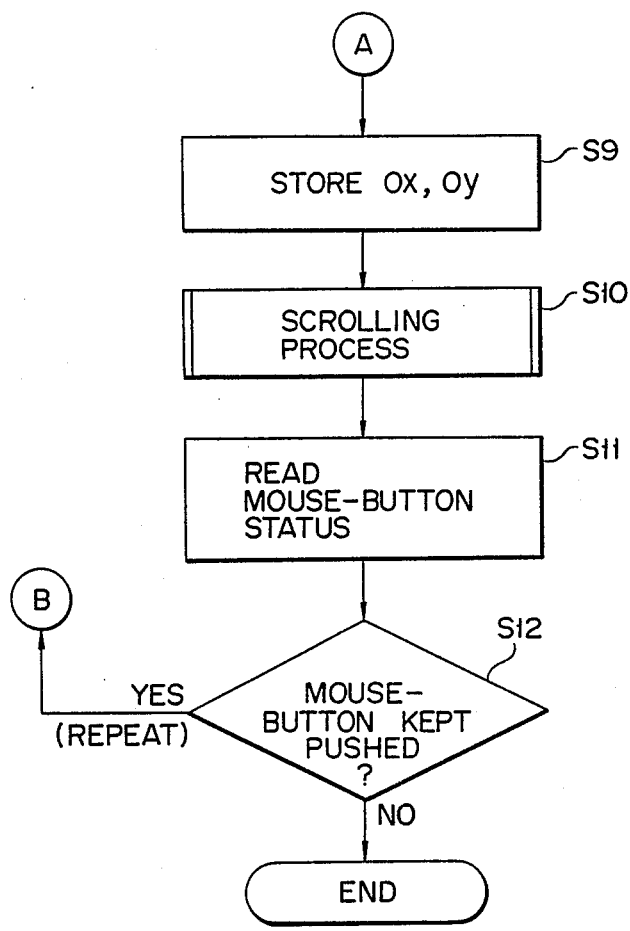

The control sequence after the scrolling process will now be explained, referring again t FIG. 6B. After completing the scrolling process in step S10, control processor 10 reads the button status of mouse 24 from input interface 30 (step S11). Then, control processor 10 determines whether or not left button 26 of mouse 24 is kept pressed (step S12). In step S12, the mouse position is not considered. When left button 26 is pressed, the control process returns to step S4, repeating the aforementioned control sequence. When left button 26 is not pressed, the control sequence ends.

Figure 6C:
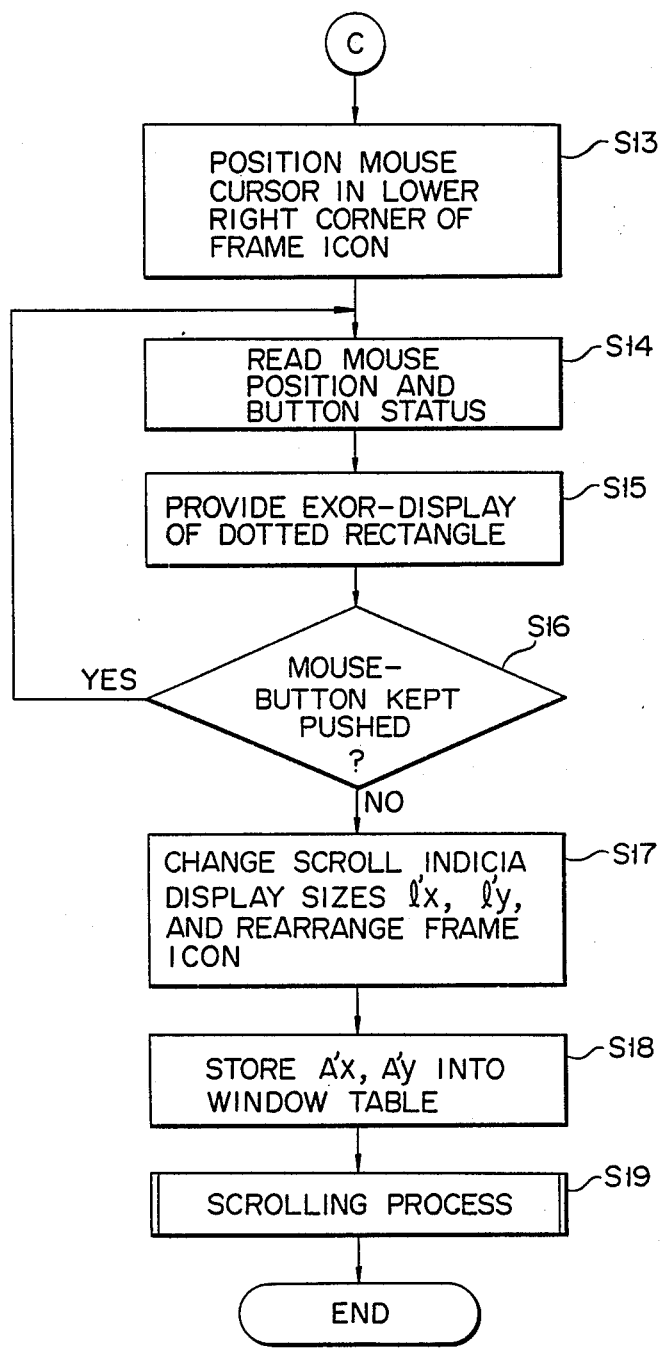
Figure 7:
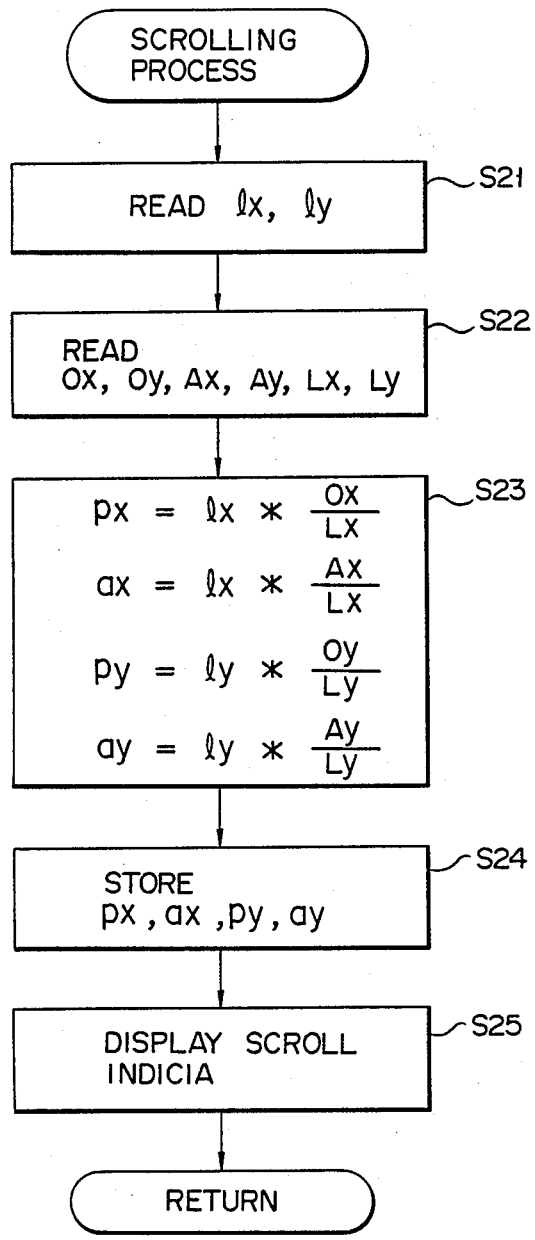
FIG. 7 is a flow chart for explaining the scrolling process shown in FIGS. 6A to 6C.

Now, when it is determined in step S4 that the mouse cursor is pointing at slanted arrow icon 51, the control process advances to step S13 illustrated in FIG. 6C.

Figure 8A:
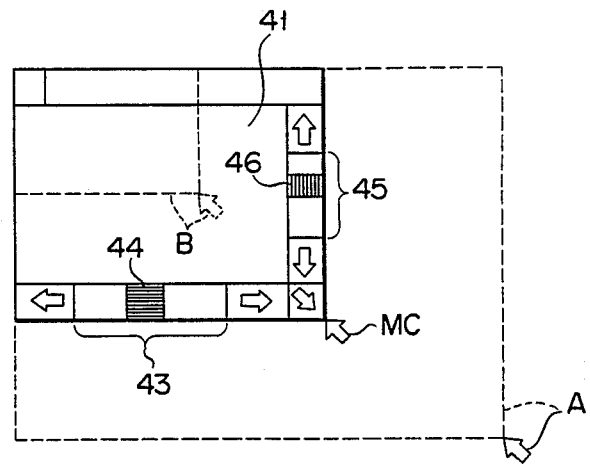
FIGS. 8A and 8B are plan views for explaining the expansion and contraction of a window.

Control processor 10 controls display processor 36 to display the mouse cursor MC (the arrow) at the lower right corner of frame icon 42, as shown in FIG. 8A (step S13). The operator manipulates mouse 24 to move the mouse cursor MC to a desired location on the monitor screen.

As is done in step S1, control processor 10 reads the position of the mouse cursor MC and the button status of mouse 24 from input interface 30 (step S14). Control processor 10 then controls display processor 36 such that a dotted rectangle having one diagonal line, connecting the upper left corner of frame icon 42 and the current position of the mouse cursor MC (mouse position), is displayed on the screen of monitor 32 in an EXOR (exclusive OR) condition (so-called the rubber-band display) (step S15). For example, to enlarge window 61, the mouse cursor MC is moved to there indicated by reference numeral "A" in FIG. 8A, thus providing the EXOR display of a dotted rectangle A. On the other hand, to decrease the size of window 61, the mouse cursor MC is moved to where indicated by reference numeral "B," thus providing the EXOR display of a smaller dotted rectangle B. When the operator is satisfied with the size of the dotted region, he or she releases left button 26. Steps S14 to S17 are repeated until button is released.

Figure 8B:
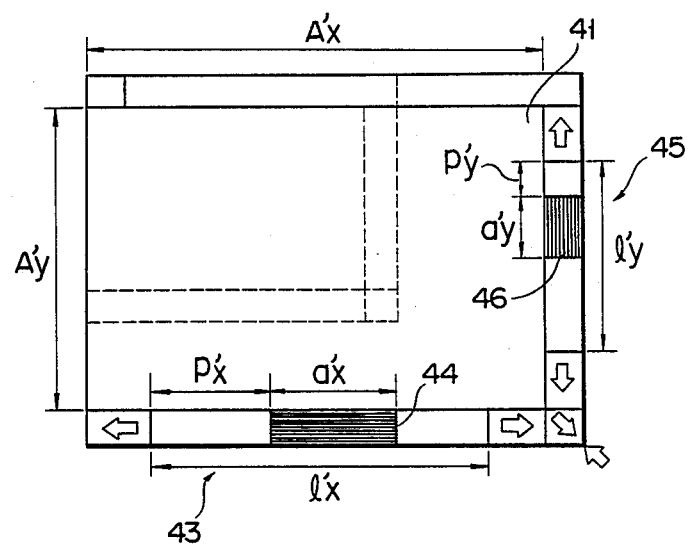

When releasing of left button 26 is detected in step S16, the control process advances to step S17. Assume that left button 26 is released at the position where the mouse cursor MC is at position "A" in FIG. 8A. Then, in step S17 a rectangle with one diagonal connecting the upper left corner of current frame icon 42 and the mouse cursor position A is considered as a resized window display region 41 with a new frame icon. Then, l'x and 'y of scroll indicia display regions 43 and 45 are resized to rearrange frame icon 42 as shown in FIG. 8B. (As mentioned before, in this embodiment, icons 47-51 do not change their sizes, irrespective cf the size of window display region 41.) The dotted line in FIG. 8B indicates window display region 41 before the resizing. The contents of the resized window are displayed on the resized window display region 41. Then, control processor 10 obtains the X-direction size A'x and the Y-direction size A'y of the resized window display region 41 as those of the resized window 61 and replaces the old Ax and Ay of the associated entry of window table 17 with the new ones (step S18). Control processor 10 then performs the scrolling process illustrated in the flowchart of FIG. 7 to display the positional and size relationship between resized window 61 and window movable region 62 (step S19), thus completing the control sequence.

In the embodiment above, portion of the image screen is displayed in the same size on monitor 32. However, such a partial screen may be enlarged or contracted on monitor 32; in this case, it is necessary to calculate sizes Ax and Ay of resized window 61 by multiplying the sizes of window display region 41 by a proper factor.

In the aforementioned embodiment, this invention is applied to a document processing device with a multi-window display function. But, this invention can also apply to a document processing device provided with only a single-window display function. In such a device, the horizontal scroll and vertical scroll indicia display regions may be provided at the frame of the display screen instead of the frame of a window. This invention has been explained with particular reference to a document processing device, but can apply to any device with a window display function, such as a data processing device, a document processing device or a graphic processing device.

According to this invention, an operator can visually and easily grasp the position and the size of a window with respect to a region where the window can move or change its size, from the positions and the sizes of scroll indicias 44 and 66 in their respective scroll indicia display regions 43 and 45. Further, the position of the window and the area the window occupies with respect to a window movable region set for each window, not with respect to the entire image screen, are displayed, so that this invention is feasible to a technique which divides the image screen for multi-window display. (The divided sections of the image screen may overlap one another.)

What is claimed is:

1. A device having a window display function, comprising:
    display means having a visual screen for displaying image data;
    window display means for controlling said display means such that a portion of an image screen is displayed on said visual screen, through a window set on said image screen; and
    indicia display means for controlling said display means so as to display indicia on said visual screen, said indicia indicating a positional and size relationship between said window and a window-movable region. on said image screen.

2. A device having a window display function, comprising:
    display means having a visual screen for displaying image data;
    window display means for controlling said display means such that a portion of an image screen is displayed on said visual screen, through a window set on said image screen; and
    indicia display means for controlling said display means so as to display indicia on said visual screen, said indicia indicating a positioned and size relationship between said window and a window-movable region on said image screen, in which said window can move and/or change its size, wherein said indicia includes first to fourth patterns, a ratio of the length of said first pattern to that of said second pattern being equal to the ratio of the length of said window to the length of said window-movable region, the ratio of the length of said third pattern to that of said fourth pattern being equal to a ratio of the width of said window to the width of said window-movable region, a position relationship between said first pattern and said second pattern corresponds to a position relationship between said window and said window-movable region, with respect to the horizontal direction, a position relationship between said third pattern and said fourth pattern corresponds to a position relationship between said window and said window-movable region, with respect to the vertical direction.

3. A device having a window display function, comprising:
    display means having a visual screen for displaying image data;
    window display means for controlling said display means such that a portion of an image screen is displayed on said visual screen, through a window set on said image screen; and
    indicia display means for controlling said display means so as to display indicia on said visual screen, said indicia indicating a positional and size relationship between said window and a window-movable region on said image screen, in which said window can move and/or change its size, wherein said indicia includes a first display region, a first display pattern, a second display region, and a second display pattern: said first display pattern being displayed in said first display region, said second display pattern being displayed in said second display region, a ratio of the length of said first display pattern to that of said first display region is equal to the ratio of the length of said window to the length of said window-movable region, the ratio of a length of said second display pattern to that of said second display region is equal to a ratio of the width of said window to the width of said window-movable region, a position of said first pattern displayed in said first display region corresponds to a position of said window set on said window-movable region, with respect to a horizontal direction, and a position of said second pattern displayed in said second display region corresponds to a position of said window set on said window-movable region with respect to a vertical direction.

4. The device according to claim 3, wherein said first display region is inclined horizontally on said visual screen, and said second display region is inclined vertically on said visual screen.

5. The device according to claim 4, wherein said first display region does not intersect a line extending vertically from said second display region, and said second display region does not intersect a line extending horizontally from said first display region.

6. The device according to claim 5, wherein said first and second display regions are displayed on a peripheral portion of that region of said visual screen of said display means in which said window is displayed.

7. The device according to claim 6, wherein said device is capable of displaying more than one window, and said first display region, said first display pattern, said second display region, and said second display pattern are provided for each window.

8. The device according to claim 3, wherein said indicia display means comprises:
    size-obtaining means for obtaining data of relative coordinates of a predetermined position of said window, with a predetermined point of said window-movable region acting as an origin, sizes of said window-movable region, and sizes of said window;

storage means for storing the data obtained by said size-obtaining means; and means for displaying said indicia, based on said data stored in said storage means.

9. The device according to claim 3, wherein said device further comprises means for instructing at least one action of movement, expansion, and contraction of said window on said image screen; and said indicia display means changes the sizes of said first display region, said first display pattern, said second display region, and said second display pattern, in accordance with a change in said window.

10. A method of displaying a window status, comprising:

displaying a portion of an image screen on a visual screen through the window set on the image screen; and displaying an indicia on said visual screen, said indicia representing a positional relationship and size relationship between said window and a window-movable region on said image screen, wherein the size of said indicia changes proportionally with respect to the size of said window.

11. A method of displaying a window status, comprising the steps of:

displaying a portion of an image screen on a visual screen through a window set on the image screen; and displaying an indicia on said visual screen, said indicia representing a positional relationship and size relationship between said window and a window-movable region on said image screen, where said window can move or change its size, wherein said indicia includes first to fourth patterns, a ratio of the length of said first pattern to that of said second pattern being equal to the ratio of the length of said window to the length of said window-movable region, the ratio of the length of said third pattern to that of said fourth pattern being equal to a ratio of the width of said window to the width of said window-movable region, and a position relationship between said first pattern and said second pattern corresponds to a position relationship between said window and said window-movable region, with respect to the horizontal direction, a position relationship between said third pattern and said fourth pattern corresponds to a position relationship between said window and said window-movable region, with respect to the vertical direction.

12. A method of displaying a window status, comprising the steps of:

displaying a portion of an image screen on a visual screen through the window set on the image screen, and displaying an indicia on said visual screen, said indicia representing a positional relationship and size relationship between said window and a window-movable region on said image screen, where said window can move or change its size, wherein said indicia includes a first display region, a first display pattern, a second display region, and a second display pattern; said first display pattern being displayed in said first display region, said second display pattern is displayed in said second display region, a ratio of the length of said first display pattern to that of said first display region is equal to the ratio of the length of said window to the length of said window-movable region, the ratio of a length of said second display pattern to that of said second display region is equal to a ratio of the width of said window to the width of said window-movable region, a position of said first pattern displayed in said first display region corresponds to a position of said window set on said window-movable region, with respect to a horizontal direction, a position of said second pattern displayed in said second display region corresponds to a position of said window set on said window-movable region with respect to a vertical direction.

13. The method according to claim 12, wherein said first display region is inclined horizontally on said visual screen and said second display region is inclined vertically on said visual screen.

14. The method according to claim 13, wherein said first display region does not intersect a line extending vertically from said second display region, and said second display region does not intersect a line extending horizontally from said first display region.

15. The method according to claim 14, wherein said first and second display regions are displayed on a peripheral portion of that region of said visual screen of said display means in which said window is displayed.

16. The method according to claim 12, wherein said displaying of a portion of an image screen contains displaying portions of said image screen through windows, and said displaying of an indicia contains displaying said first display region, said first display pattern, said second display region, and said second display pattern for each window.

17. The method according to claim 12, wherein said displaying of said indicia comprises:

obtaining data of relative coordinates of a predetermined position of said window, with a predetermined point of said window-movable region acting as an origin, a size of said window-movable region, and a size of said window;

storing the data obtained by said size-obtaining step in storage means; and displaying said indicia, based on said data stored in said storage means.

* * * * *